Oct. 28, 1958   F. H. ERDMAN   2,857,687
MEANS TO FACILITATE THE CLASSIFICATION AND SELECTION
OF DESIRED ENTRIES FROM A LIST

Filed Nov. 17, 1952   5 Sheets-Sheet 1

FIG. 1

Inventor
Francis H. Erdman

By

Attorneys

Oct. 28, 1958  F. H. ERDMAN  2,857,687
MEANS TO FACILITATE THE CLASSIFICATION AND SELECTION
OF DESIRED ENTRIES FROM A LIST
Filed Nov. 17, 1952  5 Sheets-Sheet 2
FIG. 2
FIG. 4
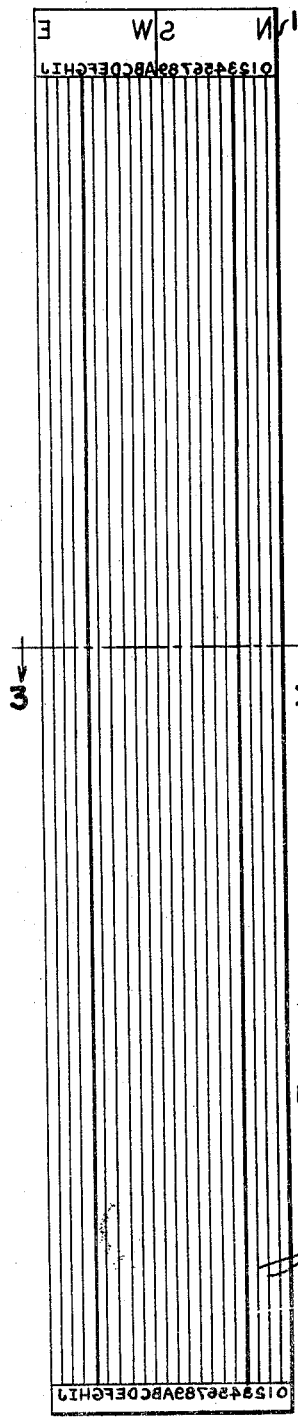
Francis H. Erdman Inventor Oct. 28, 1958
F. H. ERDMAN
2,857,687
MEANS TO FACILITATE THE CLASSIFICATION AND SELECTION
OF DESIRED ENTRIES FROM A LIST
Filed Nov. 17, 1952
5 Sheets-Sheet 3
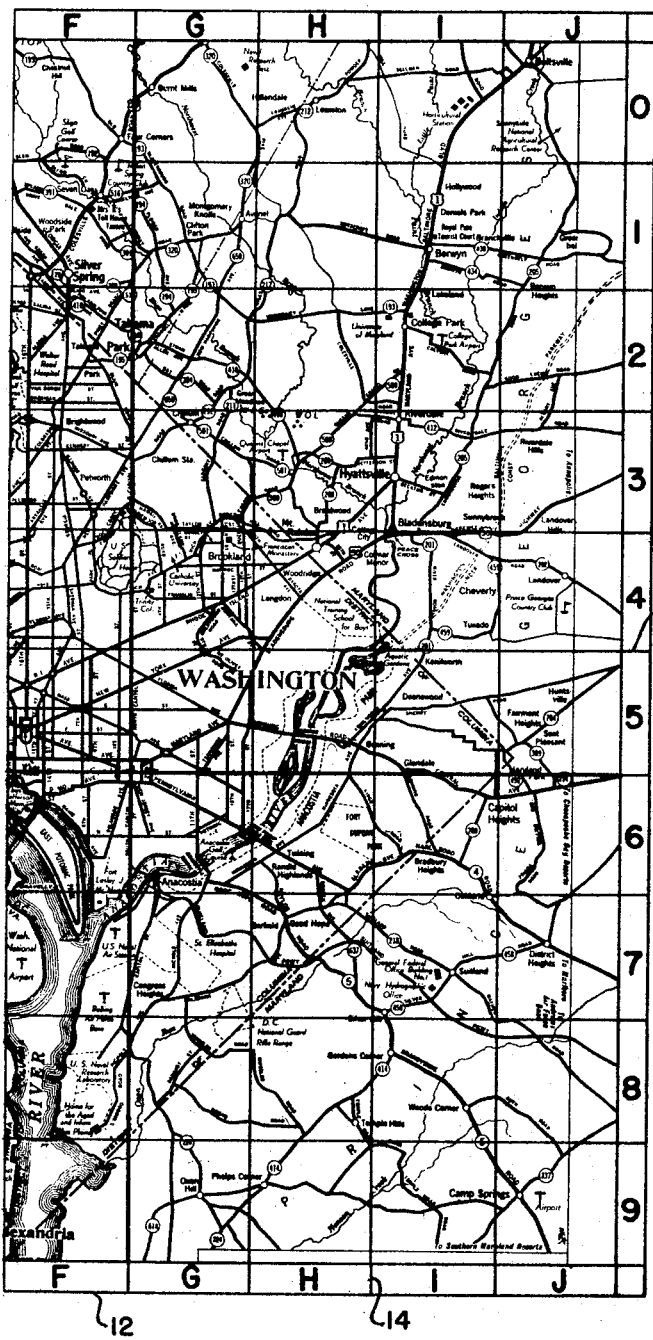
FIG. 4ª
FIG. 3
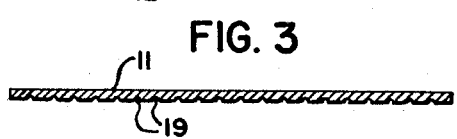
Inventor
Francis H. Erdman
By
Attorneys

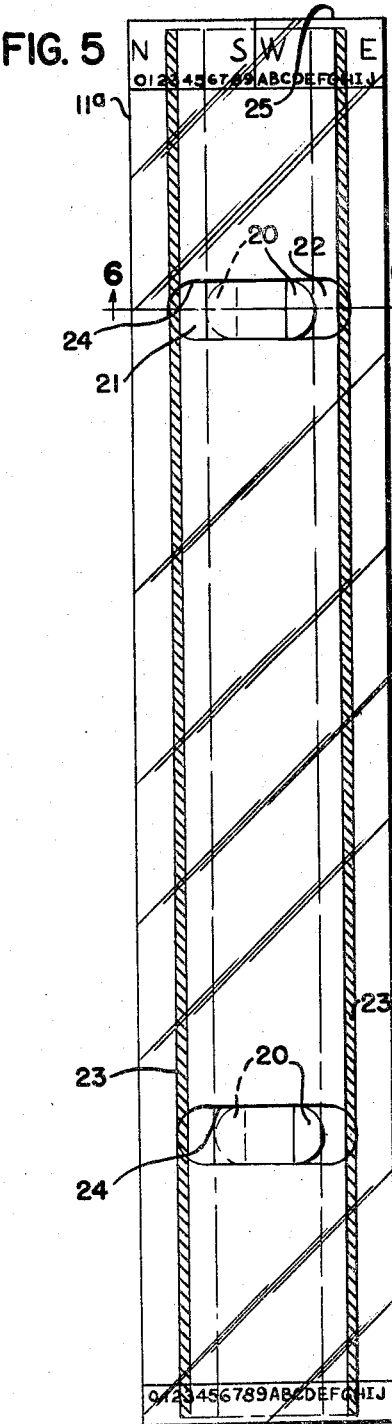
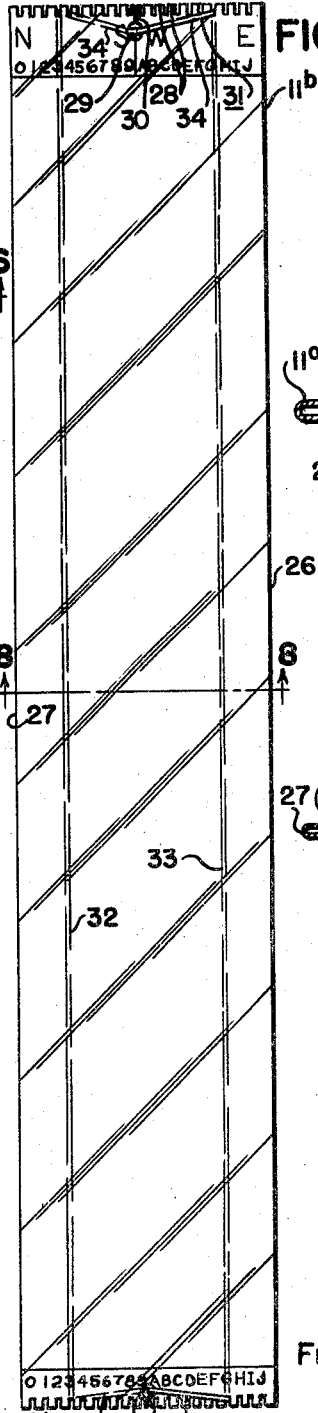
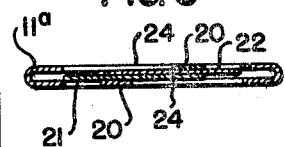
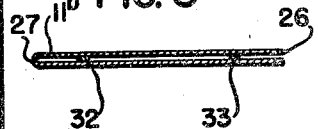

Oct. 28, 1958　　　　　F. H. ERDMAN　　　　　2,857,687
MEANS TO FACILITATE THE CLASSIFICATION AND SELECTION
OF DESIRED ENTRIES FROM A LIST
Filed Nov. 17, 1952　　　　　　　　　　　　　5 Sheets-Sheet 5

FIG. 9

Inventor
Francis H. Erdman

United States Patent Office 2,857,687
Patented Oct. 28, 1958

2,857,687

MEANS TO FACILITATE THE CLASSIFICATION AND SELECTION OF DESIRED ENTRIES FROM A LIST

Francis H. Erdman, McLean, Va.

Application November 17, 1952, Serial No. 320,925

15 Claims. (Cl. 35—40)

This invention relates to means to facilitate the classification of and selection of desired entries from a list. Such lists include lists of individuals, places, businesses, documents, part numbers and the like. The purpose of this invention is to provide a new method of classifying lists which can either be used independently or in combination with the usual method of divisions and subdivisions. The principle advantage of this invention is that it is not necessary to arrange the entries of the list in any particular order and hence it can be applied to a list which is already arranged to meet other considerations.

In accordance with my invention, the classification of a list includes the grouping together or identification of all entries having some characteristic or characteristics in common. Such common characteristics may vary widely, depending on the type of list involved. By way of examples, if the list is of professional men the classification might show their specialty or their educational background. If the list is of restaurants it might show their location, price scale, or type of entertainment. If the list is of businesses it might show their financial rating, products sold, location or size. If the list is of documents such as letters, it might show the date, subject, reference, author, disposition, and the like. Heretofore the technique used in preparing and using classified lists is to group the entries into divisions and subdivisions based on one or more of the most appropriate characteristics of the entries involved. Since this invention can be applied to any list, it can be applied to a previously classified list by utilizing other characteristics, in addition to those originally used.

My invention contemplates the relating of the variations in a characteristic to the points across the width of the list or a specially provided associated column, not necessarily on the same carrier, and then by means of appropriate symbols or indicia to identify the point for each entry which corresponds to the correct value of the characteristic in question. A selector is provided for use in connection with such indicia which will enable one to quickly select particular entries on the basis of the location of the above mentioned indicia. A coder is provided which defines the relation between the location of the indicia and the values and the like of the characteristics in question.

Thus, my invention preferably includes three major components:

(1) A list having for each entry appropriate indicia located at significant points across the width of the list or an associated column.

(2) A selector for identifying those entries having similarly located indicia.

(3) A coder which provides the relation between the location of the indicia and the values of the characteristics in question.

For purposes of illustration in accompanying drawings I have shown a practical application of my invention as applied to business listings in a telephone directory wherein each entry has a line associated with it, the opposite ends of which provide a pair of indicia points associating it with its location on a map constituting a code and in order to quickly select the desired entry a transparent selector is provided, having reference lines thereon corresponding with the indicia points of the entry to be selected. Thus when this selector is positioned over a column of such entries the selection of the entry or entries as to location, may be determined at a glance, as such reference lines are positioned to depict a definite location on the code map and all entries having their indicia points corresponding with the two reference lines on the selector will be in such selected definite location. By changing the positions of such reference lines on the selector any other desired location on the code map may be established for selection of corresponding entries. Of course, where no particular reference point is involved, a selector having lines corresponding to all indicia points, as shown in one form of selector, the selector may be used to locate on the map code each of the entries.

The above example has reference to geographical location of the entries, places of business. However as previously indicated my invention is not limited to such geographic coding. Obviously different forms of codes may be employed as for example in business, accounting, price lists and discounts or even secret coding arrangements.

Further objects and advantages of my invention will appear in the following description of an application, thereof to a list of telephone subscribers for the purpose of illustration, reference being had to accompanying drawings forming a part of this specification.

In the drawings:

Fig. 1 is a plan view of a portion of a page from a classified telephone directory wherein the list entries bear indicia and a selector is superimposed over one of the columns of listings.

Fig. 2 is a plan view of the reverse side of the selector shown in Fig. 1.

Fig. 3 is an enlarged sectional view taken on line 3—3 of Fig. 2.

Figs. 4 and 4ª comprise a plan view of the coder—in the example shown, a map for locating the list entries selected from the page shown in Fig. 1.

Fig. 5 is a plan view of a modified form of selector.

Fig. 6 is a sectional view taken on line 6—6 of Fig. 5.

Fig. 7 is a plan view of a further modified form of selector.

Fig. 8 is a sectional view on the line 8—8 of Fig. 7.

Fig. 9 is a plan view of a further modified form of selector superimposed over two columns of the telephone classified list page shown in Fig. 1.

A classified telephone directory is frequently used to find the nearest beauty parlor, garage, plumber, or restaurant, by way of examples. The procedure followed involves noting the location of each entry under the subdivision in question until the nearest one is found. Frequently this method has proved very time consuming and therefore in accordance with my invention, I have provided means of reducing the time and inconvenience to a minimum.

This invention provides means for relating the geographical location of any address to some particular point or points along the width of the telephone directory column in which each telephone is listed. The method of selecting and identifying these points is not considered as significant as the basic principle that corelations can be established between them and the geographical location of the various telephones. The following is presented as one practical means of utilizing this principle.

In general, for the purpose of illustration, the principles of this invention are shown applied to a list 10 of telephone subscribers and in particular the classified telephone book is used although the alphabetical list would serve just as well. Several variations of selectors, 11, 11ᵃ, 11ᵇ and 11ᶜ are shown together with a coder 12, which in this case is a map, since the location of each telephone is the characteristic in question.

Actually, in connection with such telephone listings, there are two characteristics involved, the north-south location and the west-east location, hence two indicia are required for coordination on the coder 12, comprising the map which, as shown in Figs. 4 and 4ᵃ, is divided into halves so that it may be illustrated to a larger scale on the drawing sheets. As shown, the coder or map 12 which may be in sections, though preferably as a whole and not separated, is divided into horizontal and vertical spaces or zones by equally spaced parallel lines 13 and 14 respectively. The horizontal zones or spaces 0 to 9 inclusive defined by horizontal lines 13, define the location's north to south, while the vertical zones or spaces A to J inclusive defined by vertical lines 14 define the locations west to east. The indicia applied to the list entries consist of a pair of dots 15 and 16 applied to each list entry corresponding with north-south and west-east locations of the coder or map 12.

It is desirable, but not necessary, to limit each indicium to any point within a half of a column width 17, thereby avoiding overlapping. In this case the indicia dots 15 and 16 are preferably connected by a line 18 and applied as horizontal underlinings of varying lengths under the first line of each entry, and the ends of each underline are considered as representing the dots 15 and 16, the desired indicia. The left hand end of the line 18, that is dot 15, corresponds to the north-south location and the right hand end of the line, the dot 16, corresponds to the west-east location. Thus, two characteristics can be identified at once, whether they be location, profession, cost, dates, size, financial rating, or the like. Thus, the two characteristics are represented by the two dots, one 15 in the left half of a column 17 of the list 10 and the other 16 in the right half of the column and where other indicia are not applied, the solid line 18 connecting these dots facilitates the observation of the indicia, the ends of such line being the indicia points to be considered in making the selection of the desired entry.

In applying such indicia to a list, which could be classified advertisements, amusement places in newspapers, magazines or the like, telephone alphabetical, or classified listings as shown in the drawings, let it be assumed that the area covered by a particular directory is first subdivided by a rectangular grid consisting, for example, of ten equal units on each side. The width of the printed directory column 17 is thus correspondingly divided into twenty vertical full length imaginary strips of equal width. The ten strips which compose the left hand side of the column are then considered to correspond to the ten horizontal rows of the rectangular grid and the ten strips which compose the right hand side of the column correspond to the ten vertical rows of the grid. In particular, the left hand strip corresponds to the top row and so on in order across the left hand side of the column. The next strip or the first one on the right hand side of the column corresponds to the extreme left vertical row of the grid and so on in order until the extreme right hand strip corresponds to the right hand vertical row. With such an arrangement it is then possible to relate the location of any point in the area in question to the two corresponding vertical strips of the appropriate printed column of the telephone directory.

Ideally speaking there is a point for point relationship between the map or order 12 and the printed column or associated column. In other words every point on the map corresponds to two and only two specific points of the printed column. Practically speaking it is necessary to divide both the map and the printed column into the reasonably sized subdivisions as described above.

In order to immediately interpret each underline, that is the indicia, in terms of geographical location, the transparent selector 11 is superimposed over the column or columns which are to be examined, as shown in Figs. 1 and 9.

This selector 11 preferably comprises a rectangular strip of transparent material, such as plastic, and in this form as shown in Figs. 1, 2 and 3, is provided with equally spaced parallel index or zone lines 19 in the form of grooves in the under face of the selector so as to closely engage the column in the directory to which it is to be applied. These lines define the twenty full length strips or zones of the driectory column referred to above. In particular these lines are drawn so that one line bisects each of the imaginary strips. The upper end of the selector is identified with the letters N, S, W, E engraved in the under face corresponding with north, south, west and east respectively for convenience in reference to the directions with respect to the reference point or area on the map 12, and the columns defined by the lines 19, preferably at both the top and bottom, are designated by numerals 0 to 9 inclusive and letters A to J inclusive, likewise preferably engraved in the under face of the selector.

It will be observed that two of the lines, 3 and G for example, are darkened, that is, they may be inked, and in this way any location such as 3G on the map 12, or coder may be established as a reference point or area as just mentioned, from which reference point other points as indicated by the indicia points as denoted by the underlying lines of other entries on list 10 may be compared, when the selector is superimposed over the column of list 10 to be examined. In such position, it will be noted that the indicia ends of each of the underlines 18 will terminate, one at one of the N-S lines and the other at a W-E line of the selector.

When an end or indicium of a line coincides with the reference line G between W and E, it means that that particular entry is located on exactly the same longitude as the place for which the selector has been prepared for reference. If the end of an underline lies to the right of the marked division or reference line G it means that the entry is east, and when left, west, of the reference point. Similarly, when the other end of a horizontal line coincides with the reference line 3 between N and S it means that that entry has the same latitude as that of the reference point. When an end is to the right of the N and S reference line 3, the entry is south, and when left, north of the reference point. Since the full half column width of the directory represents the full vertical and horizontal size of the city or area in question one can estimate fairly accurately just how far away a specific entry is. Obviously when both ends of an underline coincide with both reference lines, then that entry is in the reference 3G area of the map 12. This reference point or area was selected at random for the purpose of illustration. Of course other lines 19 may be darkened according to the reference point or location in which the user is interested, such as by use of pen and ink. By the use of an ink which, after drying, may be rendered soluble by water, a change from the lines which have been darkened by the ink to the darkening of other lines may be accomplished by washing away the old ink, drying and inking the newly selected lines.

With the selector 11 having the lines 3 and G marked, it is only usable in the position 3G as the point of reference and for other areas as points of reference the selectors have to be correspondingly marked. The value of marking such reference points on selectors will be readily appreciated by those using them so that the listings in the column having the nearest addresses may be detected at a glance.

In order to provide a selector which may be useful at different reference points various forms of selectors have been devised such as vari-colored strips, readily attachable lines, as well as others but most practical for such usage are the forms illustrated in Figs. 5 and 6, and Figs. 7 and 8.

In Figs. 5 and 6, the selector comprises preferably a transparent plastic flattened tubular element designated by the character of reference 11ª. This selector may be provided with vertical lines, not shown, corresponding with lines 19 on selector 11, thereby defining the twenty vertical strips or zones designated by the numerals 0 to 9 inclusive and the letters A to J inclusive, together with the direction indicating letters N–S and W–E. This tubular element provides a casing or envelope in which a pair of transparent, laterally movable strips 21 and 22 are housed, and have their inner edges positioned to overlap slightly when the strips are moved upon each other to the maximum extent. One opposite edge of each of these strips is preferably provided with a transparent colored stripe 23. Thus the colored stripes of these movable strips provide the reference lines and by moving the strips laterally in the selector casing they may be lined up to establish any reference point such as 3G above or otherwise. In order to adjust strips 21 and 22 in the casing provided by the selector envelope, this casing is provided with rectangular or oval shaped apertures 24 extending through both the upper and under walls thereof, adjacent to each end and the strips 21 and 22 are provided with finger or fingernail engaging projections 20 extending from one strip into the apertures 24 in the upper wall of the casing and from the other into the apertures 24 in the under wall thereof. The ends 25 of the selector tubing are preferably sealed closed and thereby prevent dislocation of the strips 21 and 22 in their housing.

The selector 11ᵇ shown in Figs. 7 and 8 is similar to selector 11ª comprising a transparent tubular member preferably formed by folding a transparent strip of plastic upon itself with the overlying portions adapted to be spaced slightly and open along edge 26 opposite the fold 27. This selector 11ᵇ likewise may bear the vertical lines, not shown, lettered and numbered indicia and the geographical directions as in selectors 11 and 11ª for use in connection with the indicia bearing entries of a telephone directory list. Selector 11ᵇ further has its upper and lower ends provided with equally spaced notches 28 corresponding with the spaced vertical index lines which are preferably merely represented by the notches; and upper and lower sets of letters and numerals. In the mid-portion adjacent to each of the ends is an aperture 29 extending transversely through the two portions of the selector and each of these apertures is connected with respective ends by slits 30 which may be spread sufficiently to permit the insertion of a strand of an elastic band 31. This elastic band 31 is stretched between the two overlying face portions of the selector body and provides the reference lines 32 and 33 in the manner of lines 3 and G of selector 11. The end portions 34 of this elastic band extend over the ends of the selector overlying portions from one of the line portions 32 and 33 of the band over the outer surface thereof, thence through the apertures to the outer side of the other selector overlying portion and to the other line portion of the band. In this way external loops or stretches 34 of the band provide means whereby the band may be easily moved from one set of end notches 28 to another for establishing reference lines for the selector set for any desired reference point on the coder 12. The open edge 26 is provided to facilitate initially placing the elastic band 31 and replacement of an old or broken band by a new one.

The selector may be further modified as shown in Fig. 9 by providing a transparent strip 11ᶜ of plastic material of a width to cover several columns of a telephone directory list of indicia bearing entries, a two column width selector being shown. For each column the strip may bear similar lines and letters and numbered columns and geographical symbols as described in connection with selector 11, but as shown preferably distinctive vertical lines 35 dividing the columns along midlines, as will be understood from the description of selector 11 and a line 36 dividing the selector into two selector elements and providing a guide line for overlying the column line in the telephone directory when the selector 11ᶜ is superimposed over two columns of the listings. In this form of selector a further modified arrangement for identifying the indicia points is shown comprising strips 37 of colored transparent plastic material which are adhesively attached as shown in each column for the reference lines 6 and G. In this way a distinctive transparent band is provided through which the indicia may be readily observed and a desired listing may be quickly ascertained. Obviously for other reference points both the width and positioning of the band may vary so that it is necessary to have such bands of widths varying from the minimum to maximum widths so as to cover reference points at any location on the map or coder 12. In each instance, however, it will be noted that the strip covers the column dividing line 35 and extends to the required N–S and W–E zone lines of the column as is understood from the description of the directory column and its indicia bearing entries and particularly described in connection with selector 11.

It will be seen that in using any of these selectors with reference lines thereon fixed with respect to the particular reference point, the area in which the user lives or desires to determine or select the nearest indicia bearing entries, the selection may be made at a glance of the indicia along the reference lines. As already set forth, if the ends of the indicia underlines are to one side or the other of the selector reference lines, as well as the north-south and west-east relationships that can be definitely established, the approximate distances thereof may be determined by the distance of the ends of such indicia underscore lines from the reference line both north and south, and west and east.

While the column 17 and coder 12 may be divided into zones of definite widths and the lines on the selector correspond therewith, for the purposes of illustration I have divided the map into ten zones north and south and the same west and east, likewise the selector correspondingly, so as not to complicate the parts with too many lines and yet with sufficient lines so that the location on the map may be quickly ascertained.

Thus it will be seen that any one familiar with the area covered by the listing can quickly note the direction and approximate distance of any entry selected with the selector superimposed over the indicia bearing entries, and anyone may determine the definite location on the map or coder 12 by observing the line numeral and letter of the indicia points with the selector and with these refer to the coder 12.

In the foregoing it will be seen that I have provided a list, a selector and a coder as applied to listings in a telephone directory, specifically as applied to a classified list of business firms. Obviously such arrangement may be applied to other lists having indicia bearing entries. Such lists need not necessarily be confined to persons, or businesses since the invention is applicable to lists in general. The indicia in connection with the entries of the list element, provide a code system from which selections may be made and interpreted with the selector element and decoded by reference to the coder element.

I claim:

1. Means to facilitate the selection of desired entries from a list comprising, a list arranged in a column having horizontal lines of varying lengths associated with entries of the list and crossing the mid position of the column, the ends of which lines constitute indicia points, one in each half of the column in accordance with the classification of information to be ascertained with respect to the entry, and a selector of transparent material bearing a vertically disposed reference line for each half of the list column to be superposed over the list so that the indicia points on the entries may be identified with respect to the reference lines and the desired entries selected.

2. Means to facilitate the selection of desired entries from a list comprising, a list arranged in a column having horizontal lines of varying lengths associated with entries of the list and crossing the mid position of the column, the ends of which lines constitute indicia points, one in each half of the column in accordance with the classification of information to be ascertained with respect to the entry, a selector of transparent material bearing a vertically disposed reference line for each half of the list column to be superposed over the list so that the indicia points on the entries may be identified with respect to the reference lines and the desired entries selected, and a coder which provides the relation between the location of the indicia with reference to the entries and the classifying characteristics of the entries.

3. Means to facilitate the selection of desired entries from a list wherein the list entries are arranged in and define a column, at least one indicia marking associated with each entry positioned within the width of said column so as to classify the entry as to the classified information pertaining to the entry, and a selector of transparent material to be disposed over the column of listings and said indicia, said selector bearing a vertical reference line intercepting indicia associated with certain entries of the list of entries to be selected.

4. The means as set forth in claim 3 in which the selector is provided with a plurality of grooves and in which at least one selected of said grooves is darkened by material deposited therein to display said reference line.

5. The means as set forth in claim 3 in which the reference line is movable.

6. The means as set forth in claim 3 in which the selector comprises a rectangular casing and said reference line is carried by a strip of transparent material housed in the casing and the said strip is provided with means extending through apertures in the casing for moving the strip within the casing.

7. Means to facilitate the selection of desired entries from a list wherein the list entries are arranged in a column, indicia markings defining pairs of indicia points associated with each entry positioned in opposite halves of the column with respect to the entry so as to classify the entry as to the classified information pertaining to the entry, a selector of transparent material having vertical zone lines disposed over both halves of a face thereof to be disposed over the column of listings and said indicia, two of said lines being distinctively marked as reference lines for intercepting indicia points associated with certain entries of opposite halves of the column of the list of entries to be selected, and a coder which provides the relation between the location of pairs of indicia points with reference to the entries.

8. The means as set forth in claim 7 in which the reference lines are represented by stretches of elastic band material.

9. The means as set forth in claim 7 in which the selector comprises a casing and the reference lines are represented by stretches of elastic band material within the casing.

10. The means as set forth in claim 7 in which said reference lines are provided by the opposite edges of a transparent strip.

11. Means to facilitate the selection of desired entries from a list including a selector as set forth in claim 7 wherein the said zone lines in one half of the column correspond to vertical zones on the coder and the zone lines of the other half column correspond to horizontal zones on the coder.

12. Means to facilitate the selection of desired entries from a list including a selector as set forth in claim 7 wherein the said zone lines in one half of the column correspond to vertical zones on the coder and the zone lines of the other half column correspond to horizontal zones on the coder, and the coder comprises a map having vertical and horizontal lines defining N–S and W–E zones corresponding with the zone lines on the selector.

13. Means to facilitate the selection of desired entries from a list including a selector as set forth in claim 7 wherein the said zone lines in one half of the column correspond to vertical zones on the coder and the zone lines of the other half column correspond to horizontal zones on the coder, and characters of reference associated with each of the zone lines on the selector.

14. Means to facilitate the selection of desired entries from a list including a selector as set forth in claim 7 wherein the said zone lines in one half of the column correspond to vertical zones on the coder and the zone lines of the other half column correspond to horizontal zones on the coder, and the coder comprises a map having vertical and horizontal lines defining N–S and W–E zones corresponding with the zone lines on the selector, characters of reference in the form of numerals and letters associated with the zone lines on the selector representing horizontal and vertical zones on the coder map, and corresponding characters of reference associated with corresponding zones on the coder map.

15. Means to facilitate the selection of desired entries from a list including a selector as set forth in claim 7 wherein the said zone lines in one half of the column correspond to vertical zones on the coder and the zone lines of the other half column correspond to horizontal zones on the coder, and the coder comprises a map having vertical and horizontal lines defining N–S and W–E sections and zones corresponding with the zone lines on the selector, characters of reference in the form of numerals and letters associated with the selector zone lines representing horizontal and vertical zones on the coder map, direction letter references N and S, and W and E at the head of the corresponding selector zone lines, and corresponding characters of reference associated with corresponding zones on the coder map.

References Cited in the file of this patent

UNITED STATES PATENTS

| | | |
|---|---|---|
| 332,167 | Schild | Dec. 8, 1885 |
| 1,089,741 | Batterson | Mar. 10, 1914 |
| 1,147,749 | Plato | July 27, 1915 |
| 1,276,657 | Ibanez | Aug. 20, 1918 |
| 1,334,957 | Liedstrand | Mar. 30, 1920 |
| 1,502,850 | Fisher | July 29, 1924 |
| 1,512,598 | Harriman | Oct. 21, 1924 |
| 1,544,182 | Ricks | June 30, 1925 |
| 1,591,865 | Wagner | July 6, 1926 |
| 2,052,369 | Toops | Aug. 25, 1936 |
| 2,296,799 | Rosin | Sept. 22, 1942 |
| 2,344,585 | Bailey | Mar. 21, 1944 |
| 2,615,625 | Youtcheff | Oct. 28, 1952 |